(12) United States Patent
Wuestenbecker

(10) Patent No.: US 10,801,972 B2
(45) Date of Patent: Oct. 13, 2020

(54) WOBBLE COMPENSATION FOR COMPUTED TOMOGRAPHY APPLICATIONS

(71) Applicant: GE Sensing & Inspection Technologies GmbH, Huerth (DE)

(72) Inventor: Michael Wuestenbecker, Ahrensburg (DE)

(73) Assignee: GE Sensing & Inspection Technologies GmbH, Hürth (DE)

( * ) Notice: Subject to any disclaimer, the term of this patent is extended or adjusted under 35 U.S.C. 154(b) by 37 days.

(21) Appl. No.: 16/294,343

(22) Filed: Mar. 6, 2019

(65) Prior Publication Data

US 2019/0277779 A1  Sep. 12, 2019

Related U.S. Application Data

(60) Provisional application No. 62/639,898, filed on Mar. 7, 2018.

(51) Int. Cl.

| G01K 9/00 | (2006.01) |
| G01B 15/06 | (2006.01) |
| G01N 23/046 | (2018.01) |
| G01T 1/29 | (2006.01) |

(52) U.S. Cl.
CPC ......... *G01N 23/046* (2013.01); *G01T 1/2914* (2013.01); *G01N 2223/309* (2013.01)

(58) Field of Classification Search
CPC ........ A61B 34/20; A61B 6/032; A61N 5/107; A61N 5/1049; A61N 2005/1087; G01N 23/04; G01N 23/046; G01N 2223/419; G01N 2223/3306; G01N 23/083; G01N 2291/2693

See application file for complete search history.

(56) References Cited

U.S. PATENT DOCUMENTS

2010/0329532 A1* 12/2010 Masuda ................. A61B 6/466
                                                      382/132

\* cited by examiner

*Primary Examiner* — Don K Wong
(74) *Attorney, Agent, or Firm* — Mintz Levin Cohn Ferris Glovsky and Popeo, P.C.

(57) ABSTRACT

Systems, methods, and devices for determining relative and absolute positions and orientations of a detector and an inspection part of a CT system. In some cases positions/orientations of the detector and the inspection part can be defined, at least in part, by tilt angles relative to reference axes and/or planes defined by various combinations of the reference axes. In some embodiments, sensors coupled to the detector and to a stage assembly having the inspection part coupled thereto can be used to determine the tilt angles of the inspection part and the detector, respectively. Data from the sensors characterizing tilt angles of the detector and the inspection part can be used to adjust projectional radiographs of the inspection part to correct for the mechanical wobble of the stage. By using tilt data to adjust projectional radiographs, the quality of tomographic images and 3-dimensional reconstructions of the inspection part can be improved.

20 Claims, 16 Drawing Sheets

WOBBLE COMPENSATION FOR COMPUTED TOMOGRAPHY APPLICATIONS

CROSS-REFERENCE TO RELATED APPLICATION

This application claims the benefit of priority to U.S. Provisional Patent Application No. 62/639,898, filed in the U.S. Patent and Trademark Office on Mar. 7, 2018, the entire contents of which are incorporated herein by reference.

BACKGROUND

Computed tomography (CT) processes can use radiation (e.g., X-rays) to produce 3-dimensional representations of a scanned object, including internal and external features of the object. For industrial applications, a CT system can include an emitter, or source of radiation, a rotatable stage, and a detector. To scan an inspection part, the inspection part can be rigidly mounted to the stage, and the stage can be rotated about an axis. As the part is rotated, the emitter can emit radiation (e.g., X-rays), and a portion of the radiation can travel through the inspection part. As the radiation travels through the inspection part, the radiation can be attenuated to varying degrees, depending on its travel path through the inspection part as well as material(s) that it travels through. Therefore, intensities of the radiation that travel through thick portions of the inspection part can be more attenuated than intensities of the radiation that travel through thinner portions of the inspection part. The detector can detect the radiation, including the portion that traveled through the inspection part, and the detector can deliver data characterizing the detected radiation to a computer. The computer can use the data to generate a projected image, or projectional radiograph, of the inspection part. With a sufficient number of projectional radiographs corresponding to known angles of rotation, the computer can generate cross-sectional (tomographic) images of the inspection part, as well as a 3-dimensional reconstruction of the inspection part, using tomographic reconstruction techniques.

SUMMARY

While imaging, as the inspection part rotates, the stage can experience some off-axis mechanical wobble, which can transfer to the inspection part. In some cases, mechanical wobble can include tilting of the stage such that there is a deviation between an expected axis of rotation, or reference axis, and a true axis of rotation of the inspection part. Therefore, the true axis of rotation can differ from the expected axis of rotation. The mechanical wobble can introduce noise, or artifacts, into tomographic images if it is unaccounted for prior to, or during, tomographic reconstruction. In some cases, mechanical wobble can be mitigated by using high precision bearings within the stage. Additionally, prior to scanning the inspection part, the system can be calibrated using a calibration part that has a known geometry. The calibration part can be scanned, and the computer can determine an average axis of rotation of the calibration part. The inspection part can then be scanned. After the inspection part is scanned, data characterizing the average axis of rotation can be applied within tomographic reconstruction to reduce noise within the tomographic images of the inspection part. However, the inspection part may wobble in a different manner than the calibration part, which can reduce the effectiveness of the calibration. Additionally calibration does not provide real-time data that can be used to account for unexpected wobble (e.g., due to external forces) that can occur while scanning the inspection part.

Systems, devices, and methods are provided for determining a position and an orientation of an inspection part relative to a detector of a CT system. In one embodiment, a system is provided that can include an emitter configured to emit radiation, and a stage assembly having a stage positioned at a first angle relative to a first reference axis. The stage can be configured to couple to an inspection part and to rotate the inspection part about a first rotation axis. The stage assembly can also include a first sensor coupled to the stage. The first sensor can be configured to measure the first angle. The system can include a detector positioned at a second angle relative to a second reference axis. The detector can be configured to detect at least a portion of the radiation emitted by the emitter. The system can also include a second sensor coupled to the detector. The second sensor can be configured to measure the second angle.

In certain embodiments, the system can include an analyzer configured to receive measurement data characterizing the first angle and the second angle from the first sensor and the second sensor, respectively. The analyzer can include at least one data processor configured to generate one or more images of the inspection part based on the received measurement data. The at least one data processor of the analyzer can be configured compensate for a tilt angle of one or more of the stage and the detector using the received measurement data. Based on the compensation, the at least one data processor of the analyzer can generate the one or more images. In addition, based on the compensation, the at least one data processor of the analyzer can perform an image correction operation on the one or more images.

In certain embodiments, the first sensor can be configured to measure an orientation of the stage relative to the first reference axis. The first sensor can also be configured to measure movement of the stage in a first plane and movement of the stage in a second plane perpendicular to the first plane. Additionally, the first sensor can be disposed on a surface of the stage.

In certain embodiments, the second sensor can be configured to measure an orientation of the detector relative to the second reference axis. The second sensor can also be configured to measure movement of the detector in a first plane and movement of the detector in a second plane perpendicular to the first plane. Additionally, the second sensor can be disposed on a surface of the detector.

In certain embodiments, the analyzer can be configured to receive data from the first sensor. The first sensor can be configured to detect a change in position thereof with respect to an initial position of the first sensor, and the analyzer can include at least one data processor that is configured to calculate the first angle based on the detected change in position of the first sensor. The analyzer can also be configured to receive data from the second sensor. The second sensor can be configured to detect a change in position thereof with respect to an initial position of the second sensor, and the analyzer can include at least one data processor that is configured to calculate the second angle based on the detected change in position of the second sensor.

In certain embodiments, the first angle can correspond to a tilt angle of the stage relative to the first reference axis, and the second angle can correspond to a tilt angle of the detector relative to the second reference axis.

In certain embodiments, the first sensor can be disposed on the stage such that the first sensor is configured to rotate during rotation of the stage. Alternatively, the first sensor can fixedly mounted such that the first sensor is configured to remain stationary during rotation of the stage. In this regard, the stage assembly can further include: a base; a bracket fixed to the base, the bracket having an opening formed therethrough; and a rotatable drive shaft extending through the opening of the bracket, the drive shaft configured to effect the rotation of the stage. The first sensor can be mounted to a portion of the bracket.

In certain embodiments, the first and second sensors can be digital inclinometers.

In certain embodiments, the stage assembly can further include a rotation sensor configured to measure an angle of rotation of the stage.

In one embodiment, a method is provided that can include operations of rotating a stage about a first rotation axis, the stage being positioned at a first angle relative to a first reference axis and coupled to an inspection part; emitting radiation toward the inspection part by an emitter; measuring the first angle using a first sensor coupled to the stage; detecting at least a portion of the radiation emitted by the emitter using a detector positioned at a second angle relative to a second reference axis; and measuring the second angle using a second sensor coupled to the detector.

In certain embodiments, the method can further include operations of receiving measurement data characterizing the first angle and the second angle from the first sensor and the second sensor, respectively; compensating for a tilt angle of one or more of the stage and the detector using the received measurement data; and generating one or more images of the inspection part according to the compensation.

DETAILED DESCRIPTION

Figure 1:
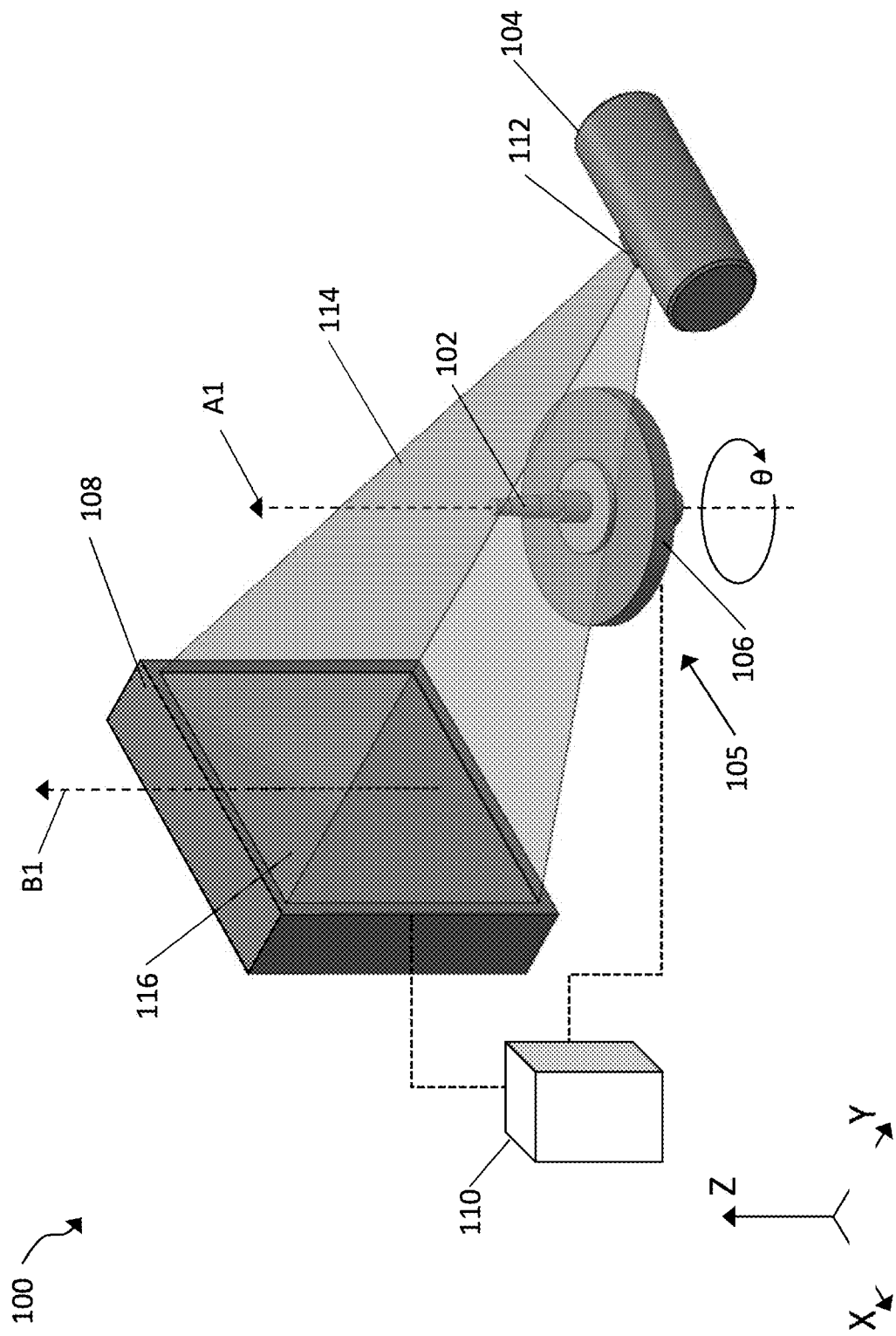
FIG. 1 is an exemplary embodiment of a computed tomography (CT) system that can be configured to generate 3-dimensional reconstructions of an inspection part.

Certain exemplary embodiments will now be described to provide an overall understanding of the principles of the structure, function, manufacture, and use of the systems, devices, and methods disclosed herein. One or more examples of these embodiments are illustrated in the accompanying drawings.

Tomography can refer to techniques that display cross-sectional representations through a body. Computed tomography (CT) is one example of tomography that can use radiation (e.g., X-rays) to produce 3-dimensional representations of a scanned object, including internal and external features of the object. Because CT can be utilized for imaging the object without damage, it has been utilized in industrial applications as a non-destructive test technique for quality assurance (e.g., flaw detection, failure analysis, geometric tolerances, etc.). A CT system can include an emitter, or source of radiation, a rotatable stage, and a radiation detector. This can allow for flexible solutions for loading and unloading of an inspection part with a higher number of degrees of freedom for fast and flexible inspection while remaining cost-effective. To scan an inspection part, the inspection part can be rigidly mounted to the stage, and the stage can be rotated about an axis. The emitter can emit radiation (e.g., X-rays), and a portion of the radiation can travel through the inspection part. The detector can detect the radiation, including the portion that traveled through the inspection part, and can deliver data characterizing the detected radiation to a computer, which can use the data to generate a projected image, or projectional radiograph, of the inspection part. With a sufficient number of projectional radiographs corresponding to known angles of rotation, the computer can generate cross-sectional (tomographic) images of the inspection part, as well as a 3-dimensional reconstruction of the inspection part, using tomographic reconstruction techniques.

As described above, mechanical wobble of the stage can cause the part to become misaligned from its expected axis of rotation during the computed tomography (CT) scanning process can introduce false information, referred to as noise or artifacts, into cross-sectional (tomographic) images and 3-dimensional reconstructions of the inspection part, and/or cause the loss of true information if it is unaccounted for (e.g., prior to, or during, tomographic reconstruction). Systems, methods, and devices are thus provided for determining a position and/or an orientation of an inspection part and a detector of a CT system.

In some cases, data from inclinometers (e.g., tilt sensors) can be used to determine the position and/or the orientation of the inspection part relative to the detector of the CT system. For example, a first inclinometer can be coupled to the stage and a second inclinometer can be coupled to the detector. Data from the inclinometers can be used to determine misalignment (e.g., variations in the position of the inspection part and/or the detector as a result of wobble) between the stage and the detector. As an example, data from the inclinometers can be used to adjust values associated with projections of the inspection part in the projectional radiographs to correct for the mechanical wobble of the stage. The use of position and/or orientation data acquired by the inclinometers to correct for mechanical wobble of the stage and/or the detector can reduce artifacts within, and unsharpness of, tomographic images and 3-dimensional reconstructions of the inspection parts. In some applications, the embodiments disclosed herein may be used for simple, inaccurate manipulator systems or robot systems, where the compensation method may have significant influence.

FIG. 1 shows an exemplary embodiment of a CT system 100 that can be configured to generate 3-dimensional reconstructions of an inspection part 102. As an example, the inspection part 102 can be any structure that interacts with (e.g., attenuates) the radiation passing therethrough while also providing sufficient transmittance of the radiation for detection. In one aspect, the inspection part 102 can be a casting, such as a pressure die casting.

In the illustrated example, the CT system 100 includes an emitter 104, a stage assembly 105 including a stage 106, a detector 108, and an analyzer 110. The emitter 104 can include an emitting element 112 that can be configured to emit a radiation beam 114, which can be, e.g., an X-ray beam. The inspection part 102 can be rigidly mounted to the stage 106 using a mechanical constraint (e.g., a clamping, suction, and/or adhesive mechanism), and the stage 106 can be positioned between the emitter 104 and the detector 108 such that the inspection part 102 extends into the radiation beam 114. In the absence of mechanical wobble, the stage 106 can be configured to rotate about an axis A1 ("first reference axis"). The axis A1 can be a reference axis that can characterize a desired, or expected, position and/or orientation of the stage 106 and the inspection part 102. In some cases, wobble can include tilting of the stage 106 such that there is a deviation between an expected axis of rotation (e.g., A1), or reference axis, and a true axis of rotation of the inspection part 102. The stage assembly 105 can include a rotation sensor (not shown) configured to measure angles of rotation of the stage 106.

The detector 108 can include a detection element 116 that can detect the radiation emitted by the emitter 104. The detector 108 can be positioned such that the detection element 116 faces toward the emitting element 112. The detection element 116 can extend along an axis B1 ("second reference axis"). The axis B1 can be a reference axis that can characterize an expected alignment, position, and/or orientation, of the detector 108 and/or the detection element 116. Axes A1, B1 can be used as reference axes which can, respectively, characterize expected positions and/or orientations of the stage 106 and the detector 108.

The analyzer 110 can include at least one data processor, and can be coupled to the detector 108 and to the stage assembly 105. In some embodiments, the analyzer 110 can be configured to control operation of the stage assembly 105 and/or detector 108. The analyzer 110 can be configured to receive data from the detector 108 and from the rotation sensor of the stage assembly 105, and to use the data to generate cross-sectional (tomographic) images of the inspection part 102, as well as a 3-dimensional reconstruction of the inspection part 102, using tomographic reconstruction techniques. The data from the detector 108 can characterize projected images, or projectional radiographs, of the inspection part 102. The data from the rotation sensor of the stage assembly 105 can characterize a rotation angle $\theta$ of the stage.

To scan the inspection part 102, the stage 106 can be rotated about the axis A1. Because the inspection part 102 is substantially rigidly coupled to the stage 106, aligning a longitudinal axis of the inspection part 102 with the axis A1 can also result in corresponding rotation of the inspection part 102 about axis A1. After the inspection part 102 is rotated to a desired position, the emitter 104 can emit the radiation beam 114 (e.g., X-rays). A portion of the radiation beam 114 can travel through the inspection part 102. The detector 108 can detect the radiation beam 114, e.g., via the detection element 116, including the portion of the radiation beam 114 that traveled through the inspection part 102. The detected radiation can characterize a projected image, or projectional radiograph, of the inspection part 102. The detector 108 can provide data to the analyzer 110 characterizing the projectional radiograph. The rotation sensor coupled to the stage assembly 105 can measure the rotation angle $\theta$ during scanning, and the rotation sensor can provide data to the analyzer 110 characterizing the measured rotation angles $\theta$. Therefore, absent mechanical wobble, each projectional radiograph can correspond to a known rotation angle $\theta$ about the expected rotation axis A1. The analyzer 110 can use the projectional radiographs, including the corresponding rotation angles $\theta$, to generate cross-sectional (tomographic) images of the inspection part 102, as wells as a 3-dimensional reconstruction of the inspection part 102, using tomographic reconstruction techniques.

Figure 2:
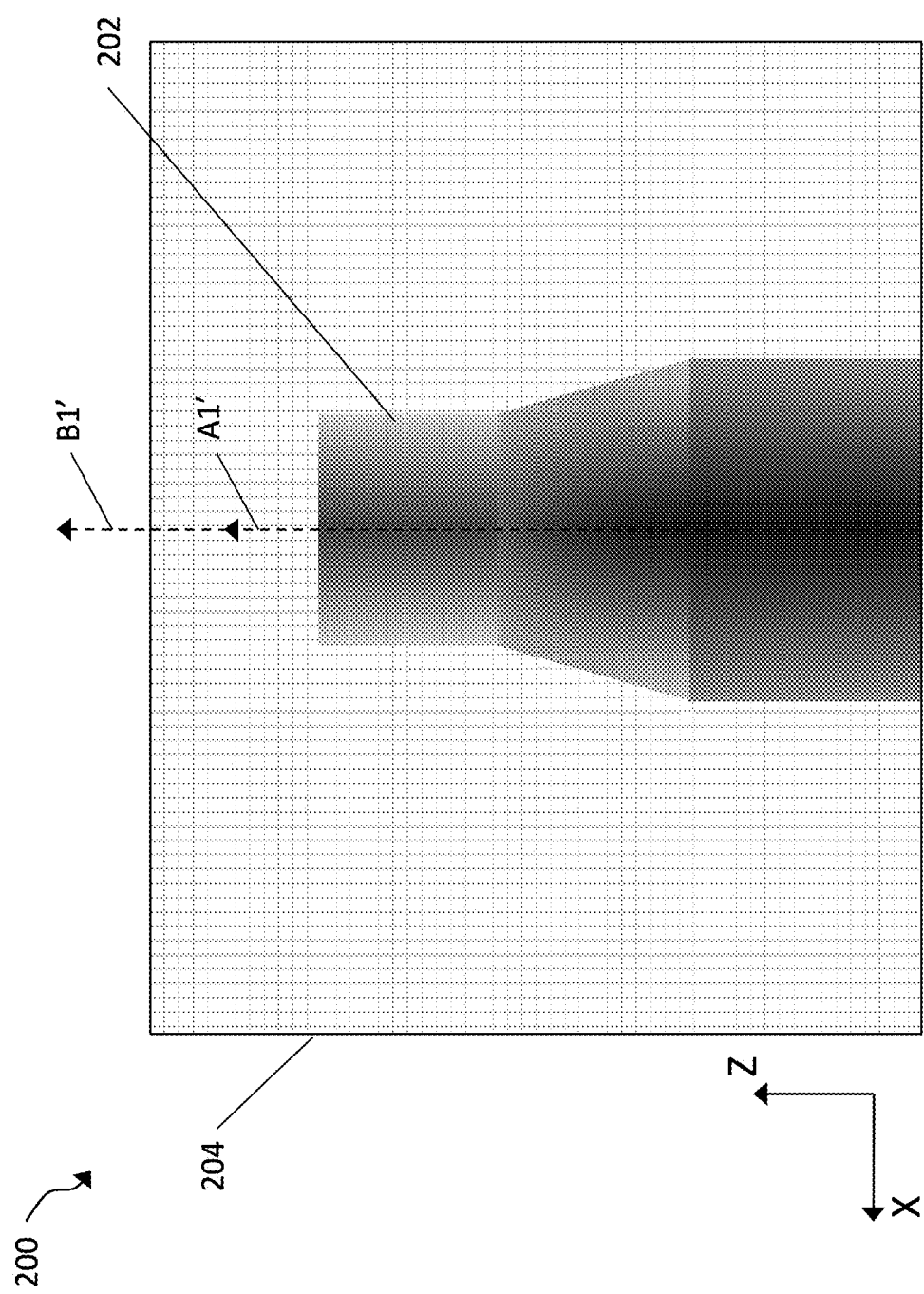
FIG. 2 is an exemplary projectional radiograph that can be generated using the CT system shown in FIG. 1.

FIG. 2 shows an example of a projectional radiograph 200 that can be generated using the CT system 100 in the absence of mechanical wobble. The projectional radiograph 200 includes a projection 202 of the inspection part 102 and can correspond to a known angle of rotation $\theta$ of the stage 106. In the illustrated example, the stage 106 is aligned as expected with regard to the axis A1, and the projection 202 of the inspection part extends along a projected axis A1'. The projected axis A1' can be a projection of the expected rotation axis A1. Similarly, the detector 108 is aligned as expected with regard to axis B1, and a frame 204 of projectional radiograph 200 extends along axis B1'. The axis B1' can be a projection of axis B1.

Figure 3:
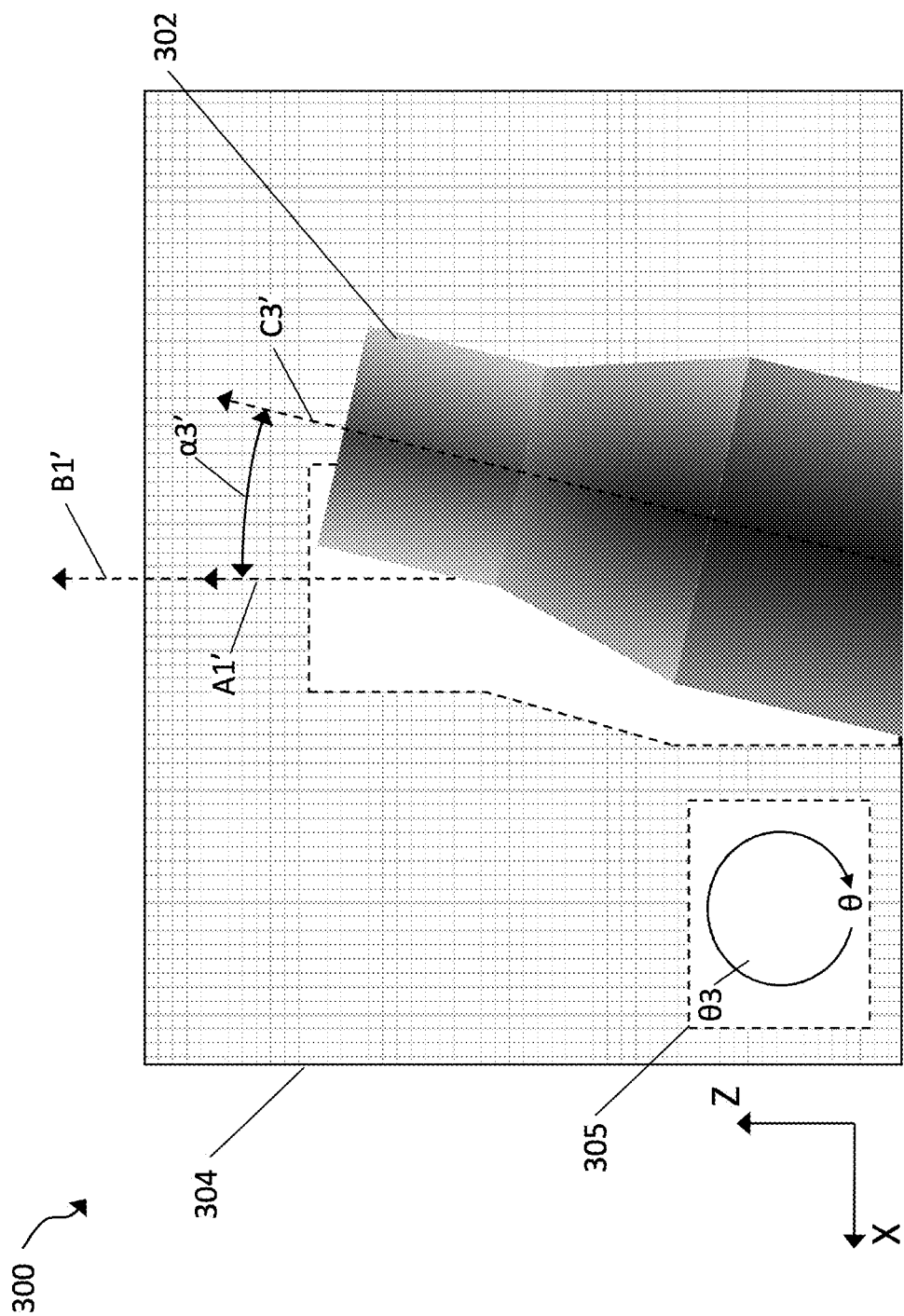
FIG. 3 is an exemplary projectional radiograph that can be generated when a stage of the CT system shown in FIG. 1 wobbles during scanning.
Figure 4:
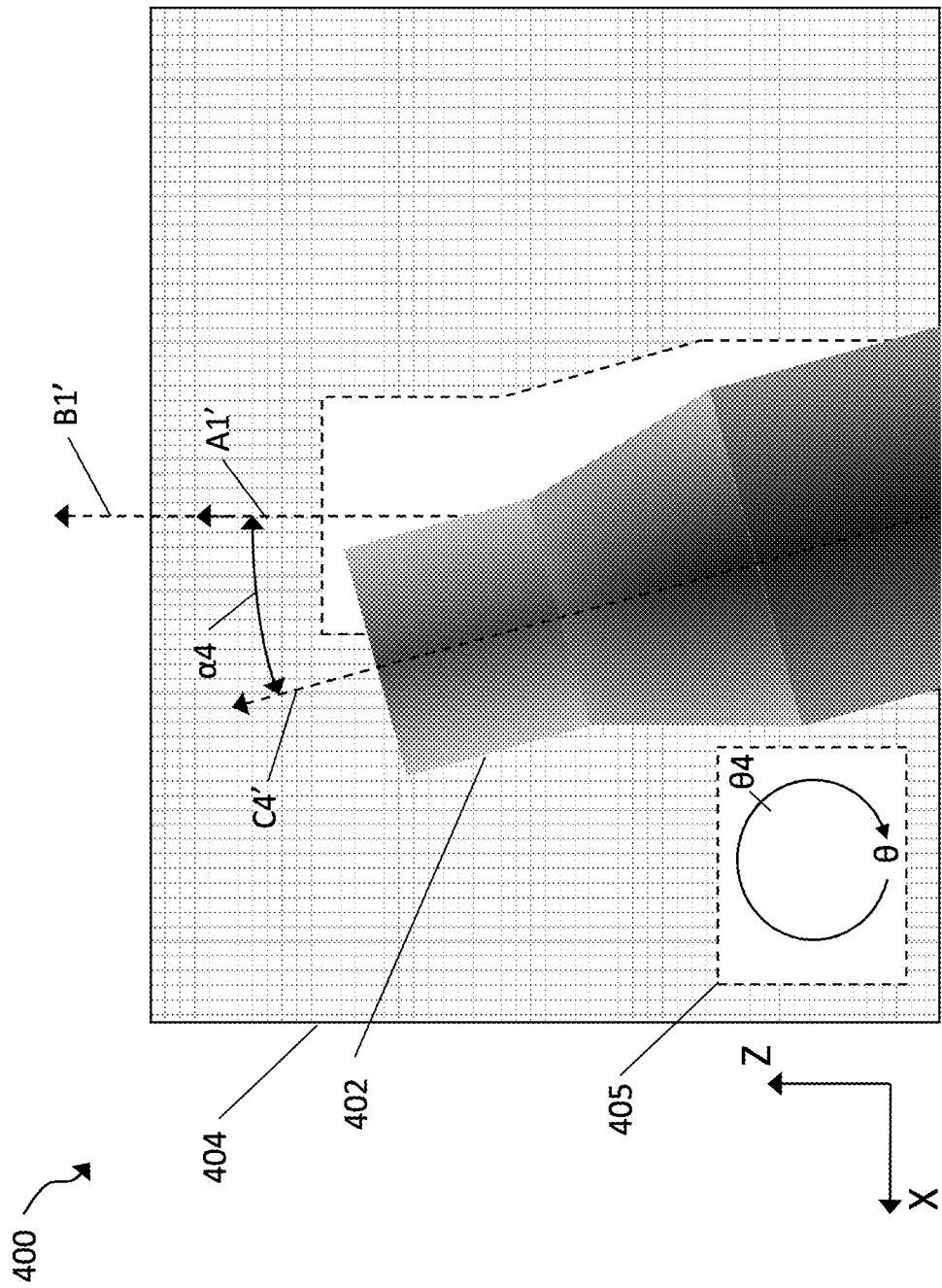
FIG. 4 is another exemplary projectional radiograph that can be generated by the CT system shown in FIG. 1 when a stage of the CT system wobbles during scanning.

In some cases, the stage 106 of the CT system 100 can wobble such that the inspection part 102 rotates about, and/or extends along, an unknown axis. FIGS. 3 and 4 show examples of projectional radiographs 300, 400 that can be generated by the CT system 100 if the stage 106 wobbles during scanning. If the stage 106 wobbles during scanning, the true axis of rotation can be different from the expected rotation axis A1. Referring to FIG. 3, the projectional radiograph 300 includes a projection 302 of the inspection part 102. The projectional radiograph 300, including the projection 302, corresponds to a known angle of rotation $\theta=\theta 3$ of the stage 106, shown in an inset 305. However, the projection 302 of the inspection part 102 extends along an axis C3', which can be a projection of a true axis of rotation of the inspection part 102. As shown in the illustrated example, the axis C3' does not coincide with the projected axis A1', and there can be some angle $\alpha 3'$ between the axes A1', C3'. The true axis of rotation of the inspection part 102 can be unknown. Therefore, the orientation of the inspection part, which resulted in the projection 302 can be unknown.

Referring to FIG. 4, the projectional radiograph 400 includes a projection 402 of the inspection part 102. The projectional radiograph 400, including the projection 402, corresponds to a known angle of rotation θ=θ4, shown in an inset 405, where θ4 can be different than θ3. The projection 402 of the inspection part 102 extends along an axis C4', which can be a projection of a true axis of rotation of the inspection part 102. As shown in the illustrated example, the axis C4' does not coincide with the projected axis A1', and there can be some angle α4' between the axes A1', C4'. The true axis of rotation of the inspection part 102 can be unknown. Therefore, the orientation of the inspection part, which resulted in the projection 402 can be unknown. As shown in FIGS. 3 and 4, axes C3' and C4' can be different. Therefore, the orientations of the inspection part 102 during scanning that resulted in the projections 302, 402, can be different.

Figure 5:
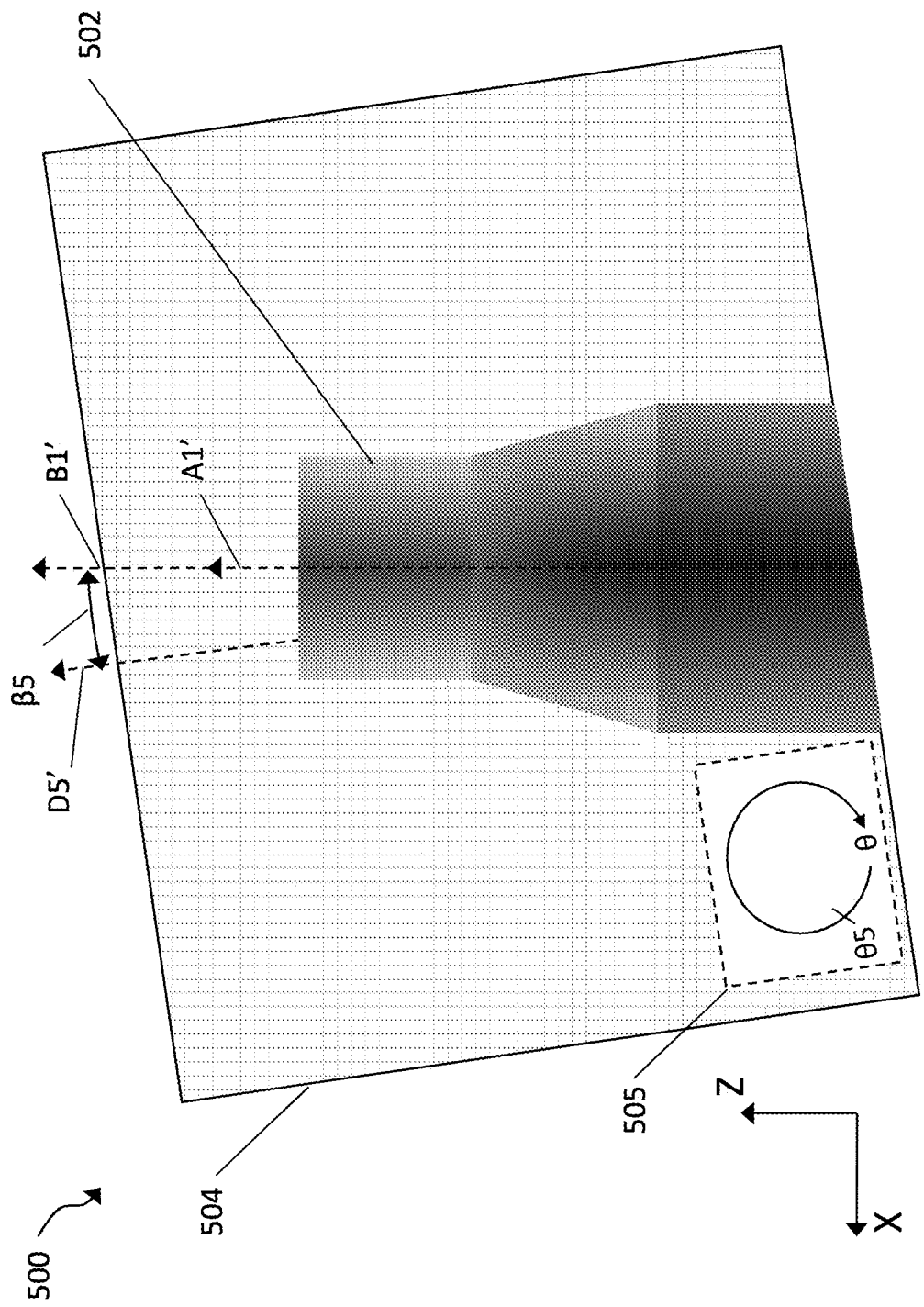
FIG. 5 is an exemplary projectional radiograph that can be generated by the CT system shown in FIG. 1 when a detector of the CT system moves during scanning.

In the projectional radiographs 300, 400 shown in FIGS. 3 and 4, the detector 108 is aligned as expected, and frames 304, 404 of the projectional radiographs 300, 400 extend along axis B1'. In some cases, the detector 108 can move during scanning of the inspection part 102. Movement of the detector 108 during scanning can result in conditions similar to those described above with regard to FIGS. 3 and 4. FIG. 5 shows an example of a projectional radiograph 500 that can be generated by the CT system 100 if the detector 108 moves, or wobbles, during scanning. The projectional radiograph 500 includes a projection 502 of the inspection part 102. The projectional radiograph 500, including the projection 502, corresponds to a known angle of rotation θ=θ5, shown in an inset 505, where θ5 can be different than θ3 and θ4. In the illustrated example, the stage 106 is aligned as expected, and the projection 502 of the inspection part 102 extends along the projected axis A1'. A frame 504 of the projectional radiograph 500 extends along axis D5', which can be a projection of an alignment axis of the detection element 116. As shown in the illustrated example, the axis D5' does not coincide with the projected axes A1', B1' which can indicate that the detector 108 was misaligned during scanning. There can be some angle β5' between the axes D5', B1'.

During tomographic reconstruction, projectional radiographs (e.g., projectional radiographs 300, 400, 500) corresponding to known angles of rotation can be used to generate cross-sectional (tomographic) images of the inspection part, as well as a 3-dimensional reconstruction of the inspection part (e.g., inspection part 102). However, tomographic reconstruction can rely on the ability to identify and characterize relationships between projections (e.g., projections 302, 402, 502) of the inspection part. In some cases, knowing the orientations of the inspection part that resulted in the projections can improve the process of identifying and characterizing relationships between projections of the inspection part. Unknown variations in the orientation of the inspection part across the radiographs can introduce noise, or artifacts, into tomographic images and/or 3-dimensional reconstructions if the variations in the orientation are unaccounted for during tomographic reconstruction.

Figure 6:
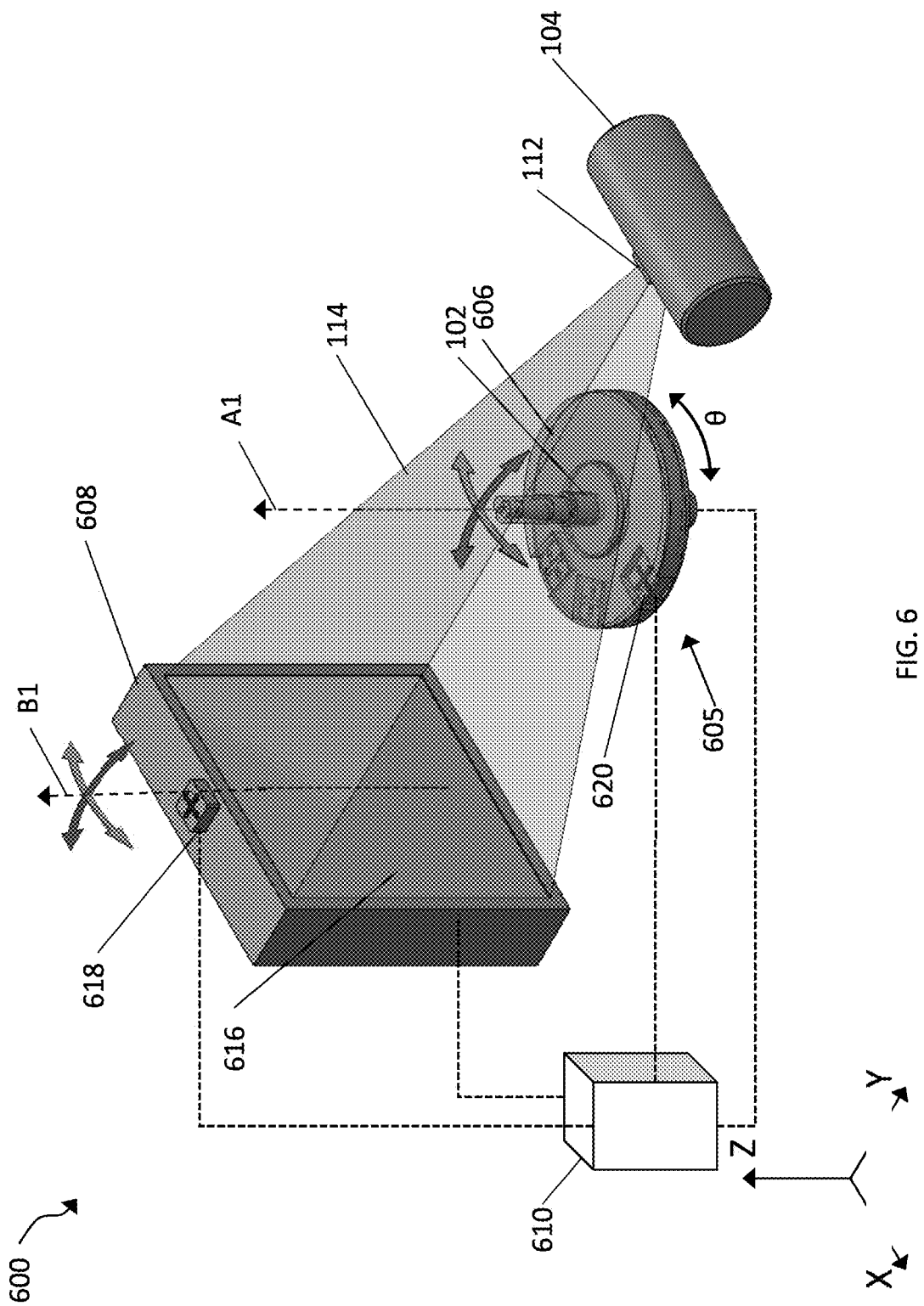
FIG. 6 is an exemplary embodiment of a CT system that includes sensors that can be configured to measure tilt of a detector and a stage of the CT system.

FIG. 6 shows an exemplary embodiment of a CT system 600 that can be configured to generate 3-dimensional reconstructions of an inspection part 102. In the illustrated example, the CT system 600 includes an emitter 104, a stage assembly 605 including a stage 606, a detector 608, and an analyzer 610. The CT system 600 can be similar to the CT system 100 shown in FIG. 1, but can include sensors 618, 620 (e.g., digital inclinometers) coupled to the detector 608 and the stage 606, respectively. The sensors 618, 620 can be configured to measure and/or facilitate determining tilt of the detector 608 and the stage 606, respectively, as discussed in more detail below. The emitter 104 can include an emitting element 112 that can be configured to emit a radiation beam 114, which can be, e.g., an X-ray beam. The inspection part 102 can be rigidly mounted to the stage 606, and the stage 606 can be positioned between the emitter 104 and the detector 608 such that the inspection part 102 extends into the radiation beam 114. The stage 606 can be configured to rotate about an axis A1 ("first reference axis") to position the inspection part at various angles θ. The stage assembly 605 can include a rotation sensor configured to measure the rotation angle θ of the stage 606. The axis A1 can be an axis about which the inspection part 102 is expected to rotate.

The analyzer 610 can include at least one data processor, and can be coupled to, and/or configured to receive data from, the detector 608, the stage 606, and the sensors 618, 620. The analyzer 610 can be configured to receive data from the detector 608, the rotation sensor of the stage assembly 605, and the sensors 618, 620, and to use the data to generate cross-sectional (tomographic) images of the inspection part 102, as well as a 3-dimensional reconstruction of the inspection part 102, using tomographic reconstruction techniques. In some embodiments, the analyzer 610 can be configured to control operation of the stage assembly 605 and/or detector 608.

Figure 7:
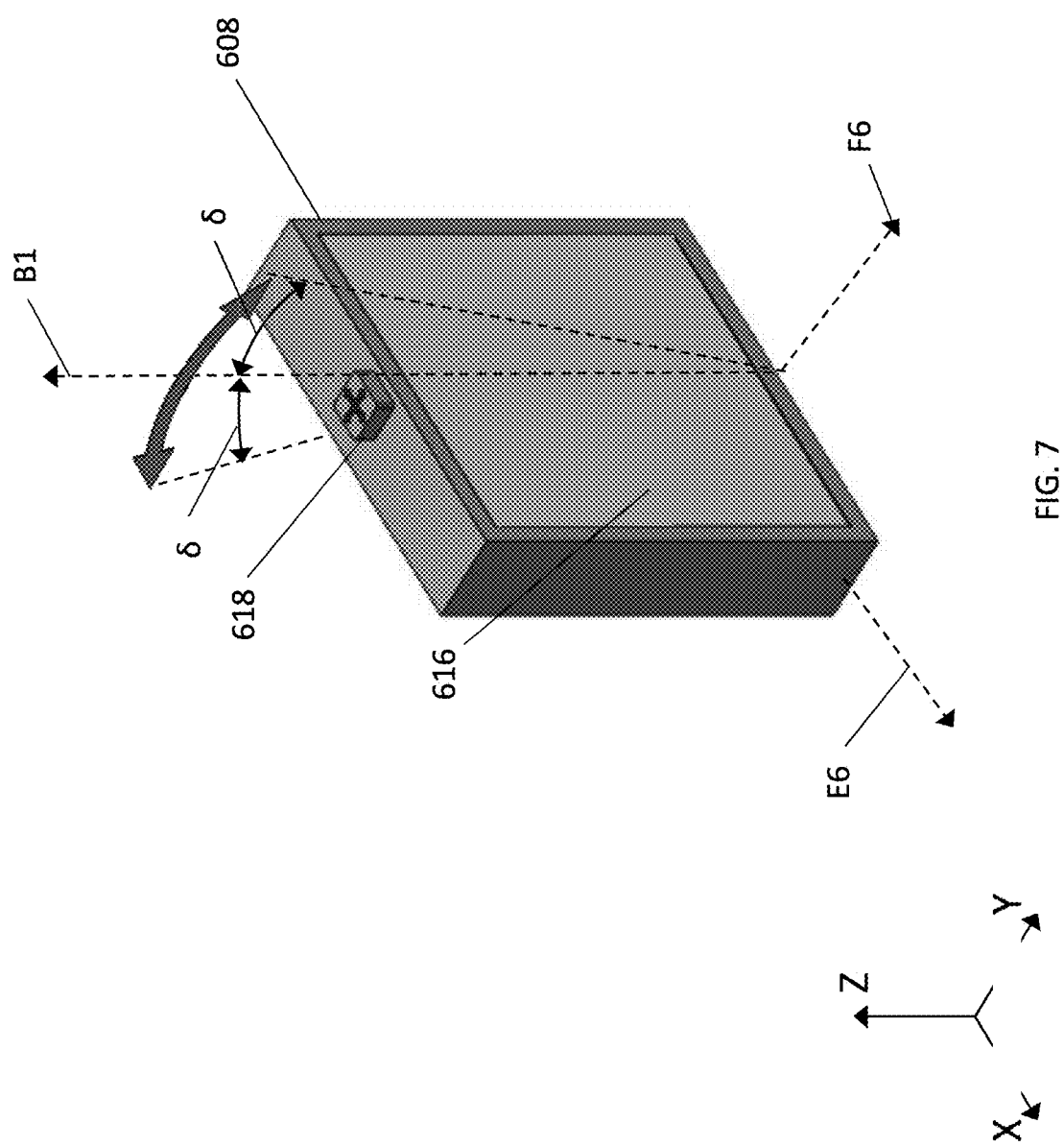
FIG. 7 is a magnified view of the detector of the system shown in FIG. 6, showing a tilt angle that can be measured by a sensor coupled to the detector.
Figure 8:
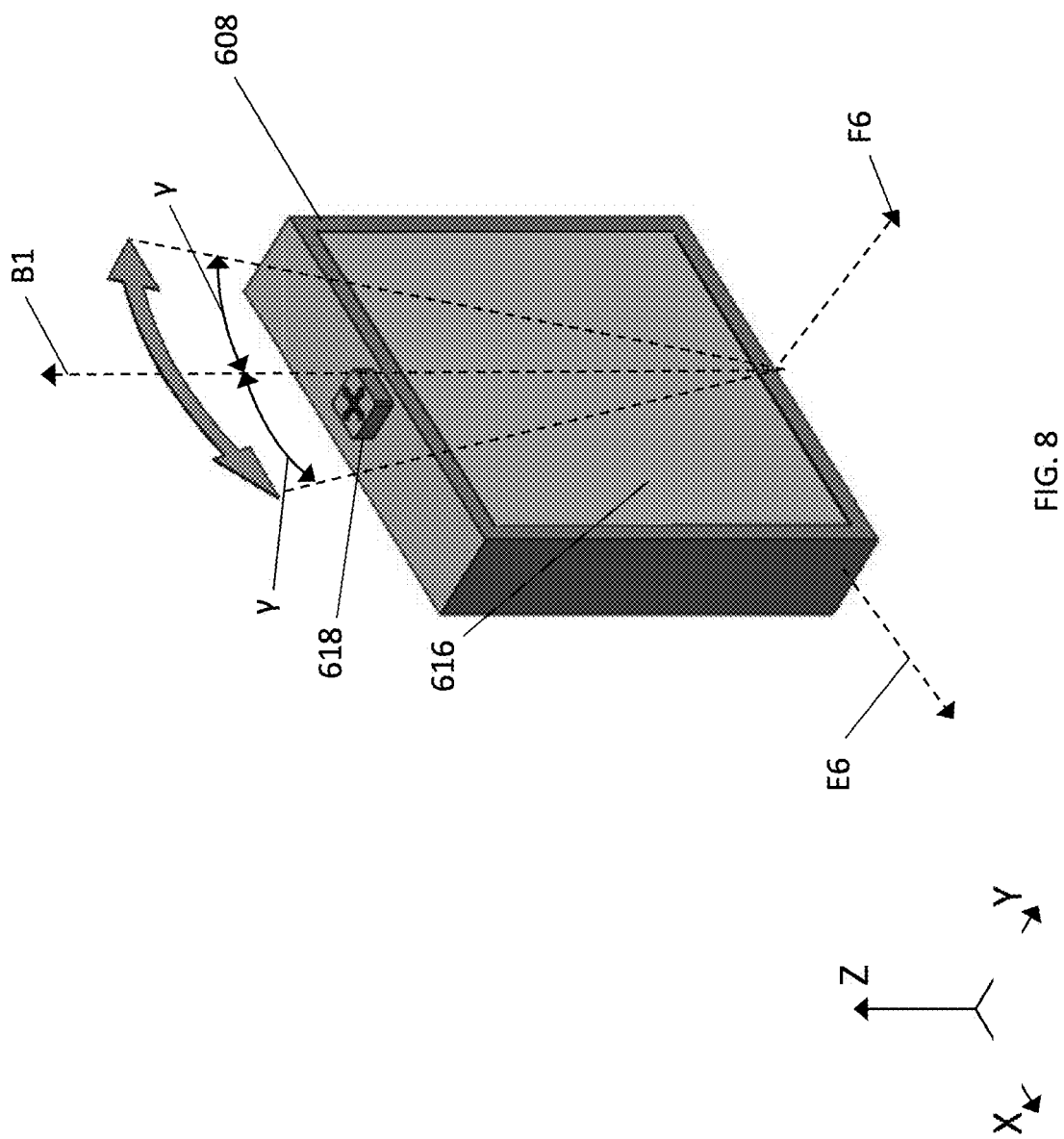
FIG. 8 is another magnified view of the detector of the CT system shown in FIG. 6, showing another tilt angle that can be measured by the sensor coupled to the detector.

FIGS. 7-8 show magnified views of the detector 608. The detector 608 can include a detection element 616 that can detect the radiation emitted by the emitter 104. In some cases, during scanning, the detector 608 can rotate, or tilt. For example, as shown in FIG. 7, the detector 608 can rotate about an axis E6 such that the detector 608 is positioned at an angle δ relative to a plane defined by axes B1, E6. Alternatively and/or additionally, the detector 608 can rotate about an axis F6 such that the detector 608 is positioned at an angle γ relative to a plane defined by axes B1, F6, as shown in FIG. 8. The sensor 618 can be configured to measure the angles δ, γ and determine an orientation of the detector 608 relative to the axis B1. The axes B1, E6, F6 can be reference axes that can identify a desired, or expected, position of the detector 608. The positions and orientations of axes B1, E6, F6 can be known.

As shown in FIGS. 7 and 8, the plane defined by axes B1, E6 and the plane defined by axes B1, F6 can be perpendicular to each other. Thus, the sensor 618 can be configured to measure movement of the detector 608 in a first plane (e.g., the plane defined by axes B1, E6) and also to measure movement of the detector 608 in a second plane (e.g., the plane defined by axes B1, F6) that is perpendicular to the first plane.

In some embodiments, the sensor 618 can be disposed on a surface of the detector 608, such as the top or upper surface thereof. In additional embodiments, the sensor 618 can be at least partially embedded into the surface of the detector 608.

Figure 9:
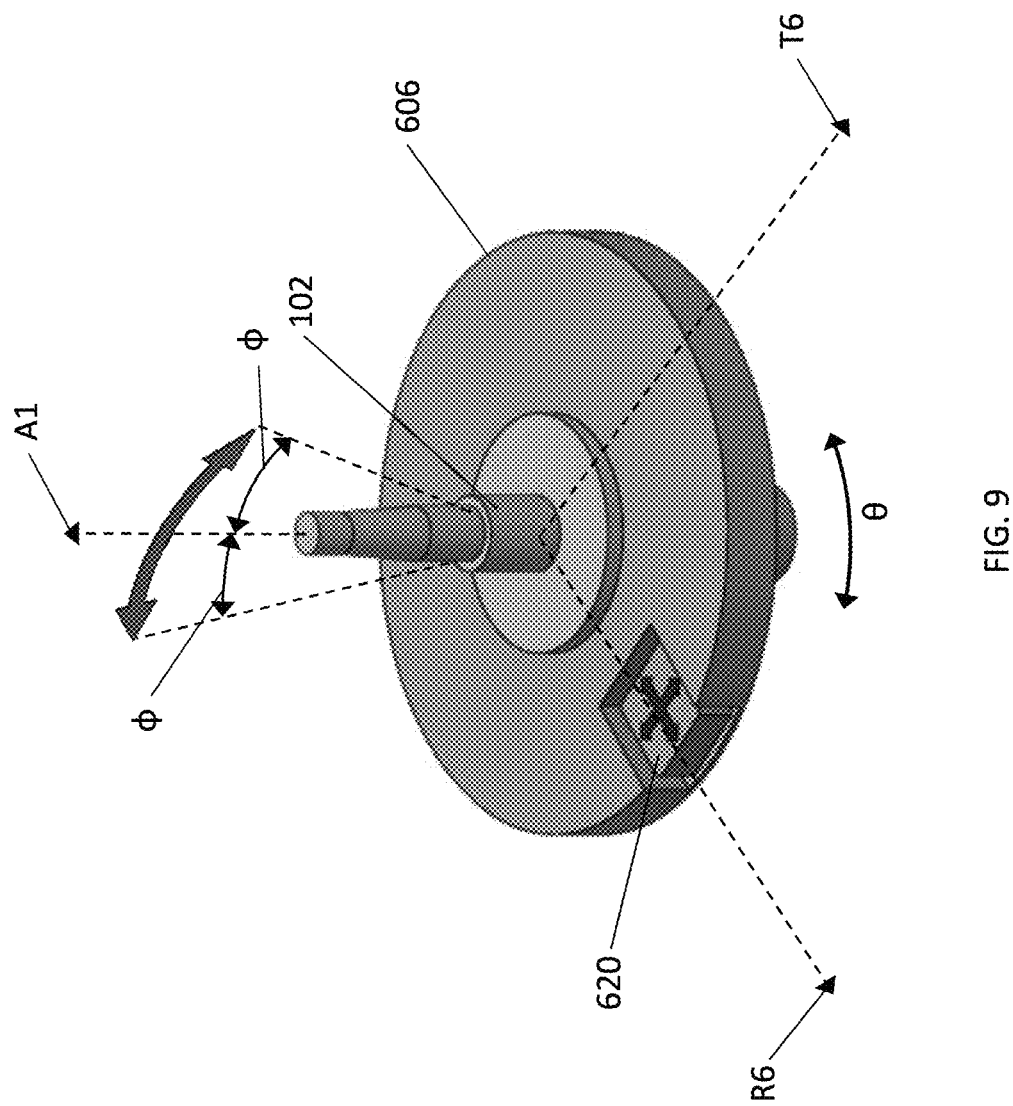
FIG. 9 is a magnified view of the stage and an inspection part of the CT system shown in FIG. 6.
Figure 10:
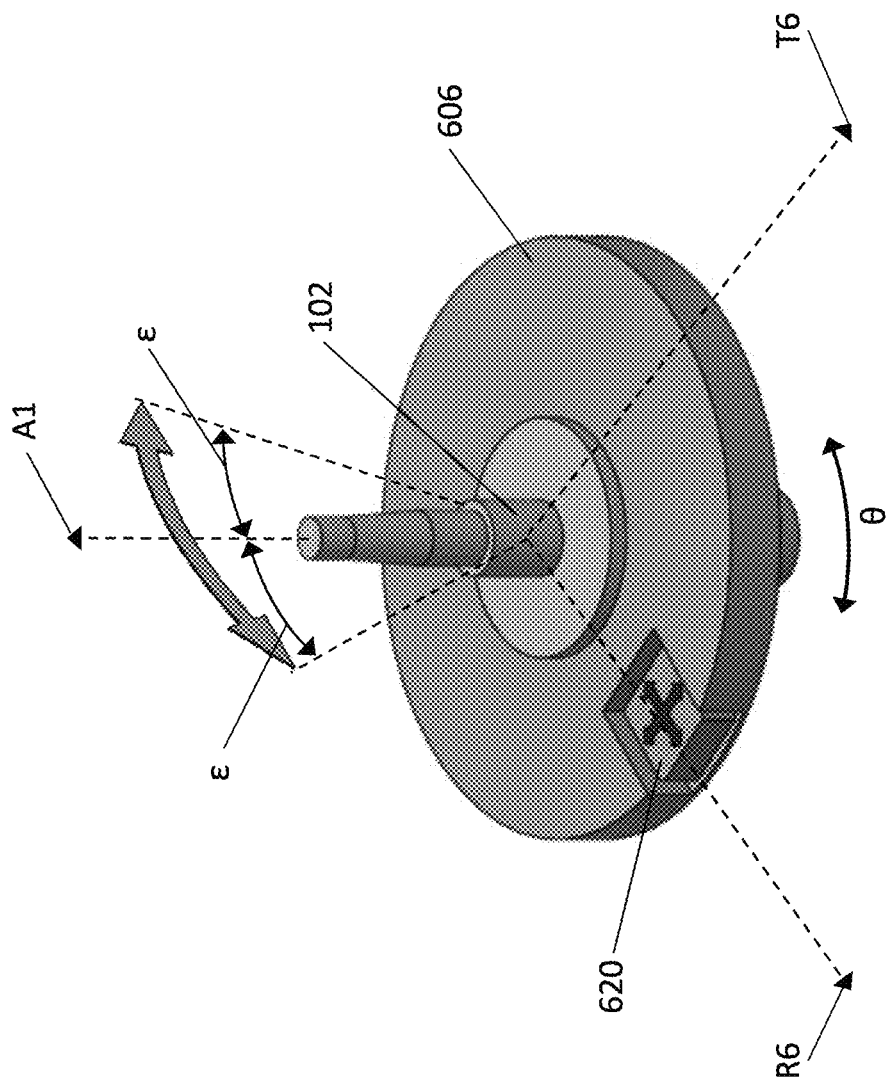
FIG. 10 is another magnified view of the stage and the inspection part of the CT system shown in FIG. 6.

FIGS. 9-10 show magnified views of the stage 606 and the inspection part 102. In some cases, during scanning, the stage 606 can rotate, or tilt. For example, as shown in FIG. 9, the stage 606 can rotate about an axis R6 such that the inspection part 102 is positioned at an angle γ relative to a plane defined by axes A1, R6. Alternatively, and/or additionally, the stage 606 can rotate about an axis T6 such that the inspection part 102 is positioned at an angle relative to a plane defined by axes A1, T6, as shown in FIG. 10. The sensor 620 can be configured to measure the angles φ, ε and determine an orientation of the stage 606 relative to the axis A1. The axes A1, R6, T6 can be reference axes that can identify a desired, or expected, position and orientation of the stage 606 and the inspection part 102. The positions and orientations of axes A1, R6, T6 can be known. The tilt angles φ, ε can define a position and/or orientation of an axis of rotation of the inspection part 102 that can be different than the reference axis A1.

As shown in FIGS. 9 and 10, the plane defined by axes A1, R6 and the plane defined by axes A1, T6 can be perpendicular to each other. Thus, the sensor 620 can be configured to measure movement of the stage 606 a first plane (e.g., the plane defined by axes A1, R6) and also to measure movement of the stage 606 in a second plane (e.g., the plane defined by axes A1, T6) that is perpendicular to the first plane.

In some embodiments, the sensor 620 can be disposed on a surface of the stage 606, such as the top or upper surface thereof. In additional embodiments, the sensor 620 can be at least partially embedded into the surface of the stage 606.

Figure 11:
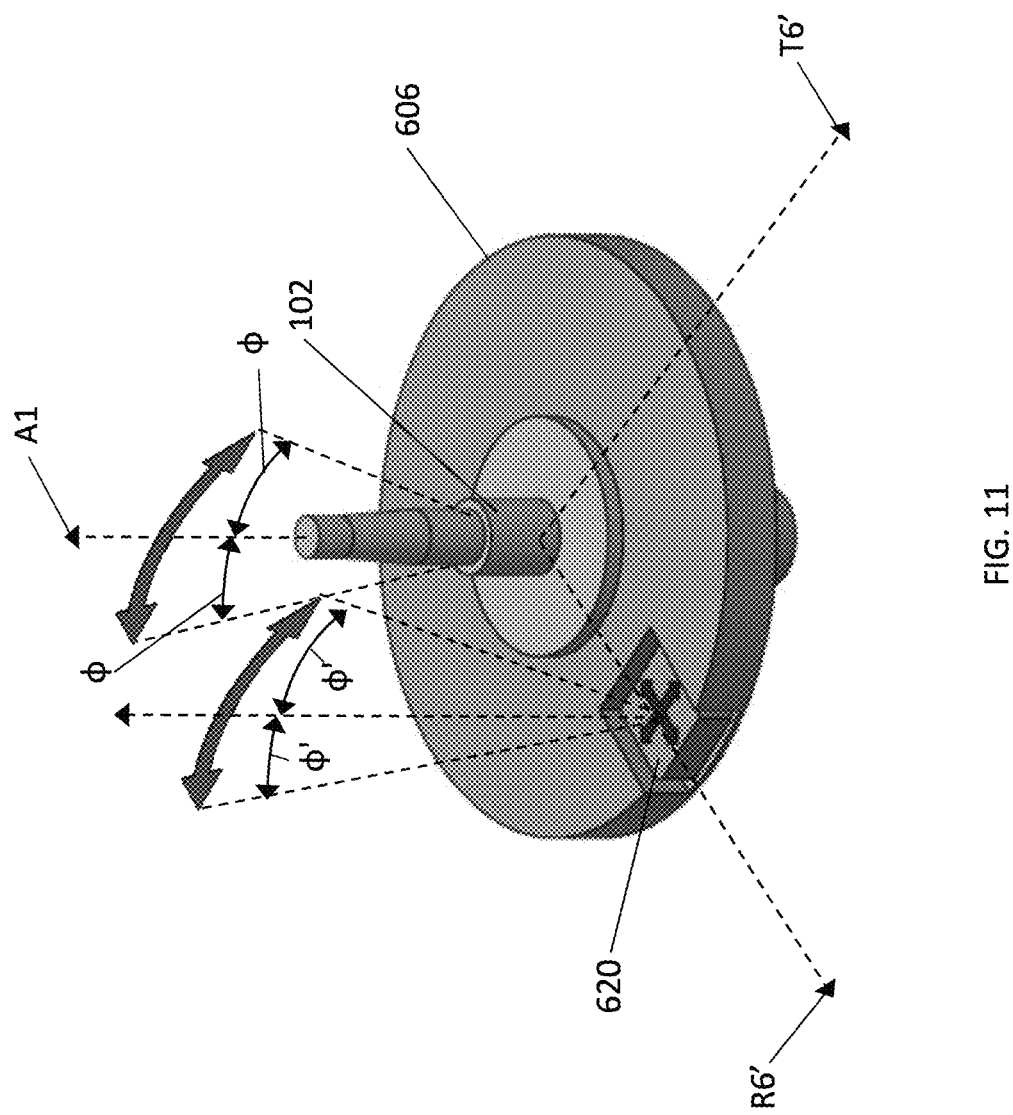
FIG. 11 is another magnified view of the stage and the inspection part of the CT system shown in FIG. 6, showing a tilt angle that can be measured by a sensor coupled to the stage.
Figure 12:
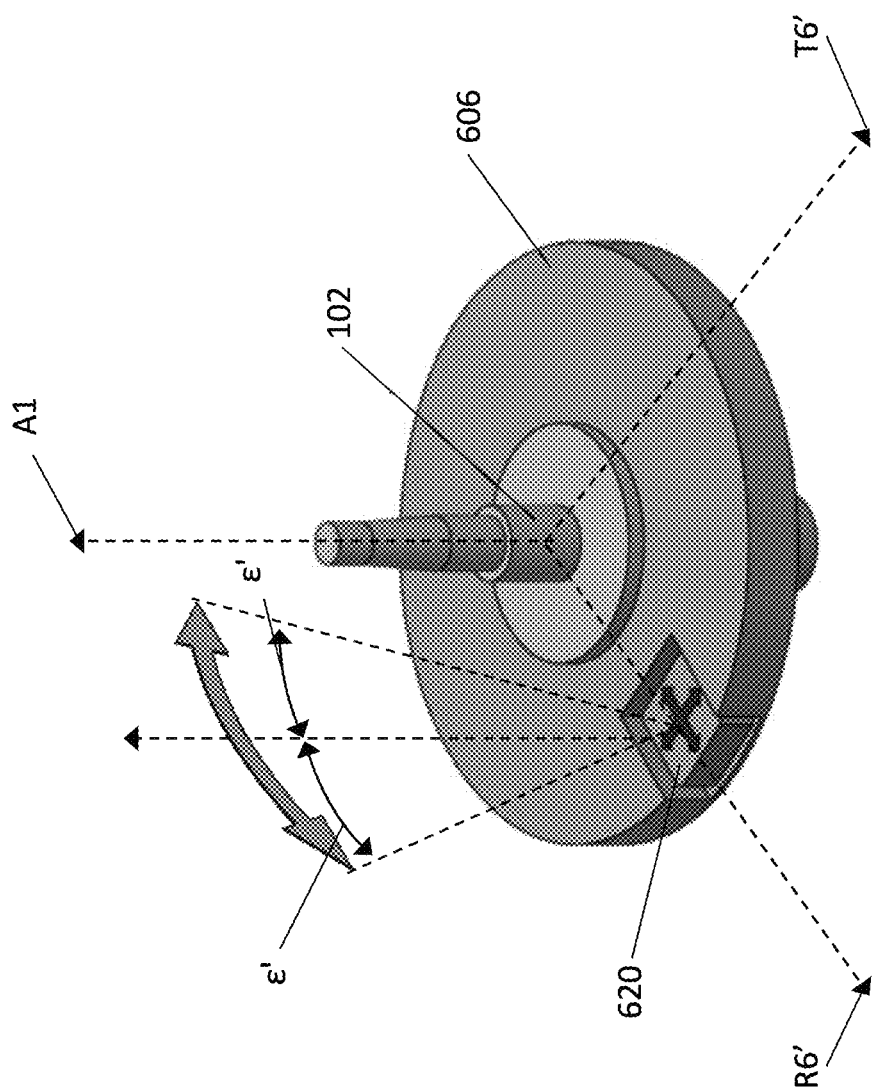
FIG. 12 is another magnified view of the stage and the inspection part of the CT system shown in FIG. 6, showing another tilt angle that can be measured by a sensor coupled to the stage.

During operation, the position of the sensor 620 can change when the stage 606 is rotated. Therefore, measurements from the sensor 620 can be based on the position of the sensor 620 with respect to an initial position thereof. For example, the sensor 620 can measure tilt angles φ', ε', as shown in FIGS. 11-12. The tilt angles φ', ε' can correspond to rotation about axes R6', T6', respectively. The axes R6', T6' can intersect the axis A1. The tilt angle φ' can be a measure of tilt of the stage 606 relative to a plane defined by axes A1, R6'. The tilt angle ε' can be a measure of tilt of the stage 606 relative to a plane defined by axes A1, T6'. The positions of axes R6', T6' can vary with the position of the sensor 620 as the stage 606 is rotated. Therefore, tilt angles φ', ε' can correspond to a position of the sensor 620, which can be characterized by the rotation angle θ of the stage 606. The tilt angles φ', ε' and the rotation angle θ can be used (e.g., by the analyzer 610) to determine the tilt angles φ, ε using, e.g., trigonometric relationships based on the position of the sensor 620 relative to the axis A1.

The sensor 618 can measure the tilt angles δ, γ of the detector 608 in a similar manner. Particularly, the position of the sensor 618 can change when the detector 608 is rotated. Therefore, measurements from the sensor 618 can be based on the position of the sensor 618 with respect to an initial position thereof. Tilt angles δ', γ' can correspond to a position of the sensor 618, and the measured tilt angles δ', γ' can be used (e.g., by the analyzer 610) to determine the tilt angles δ, γ using, e.g., trigonometric relationships based on the position of the sensor 618 relative to the axis B1.

Figure 13:
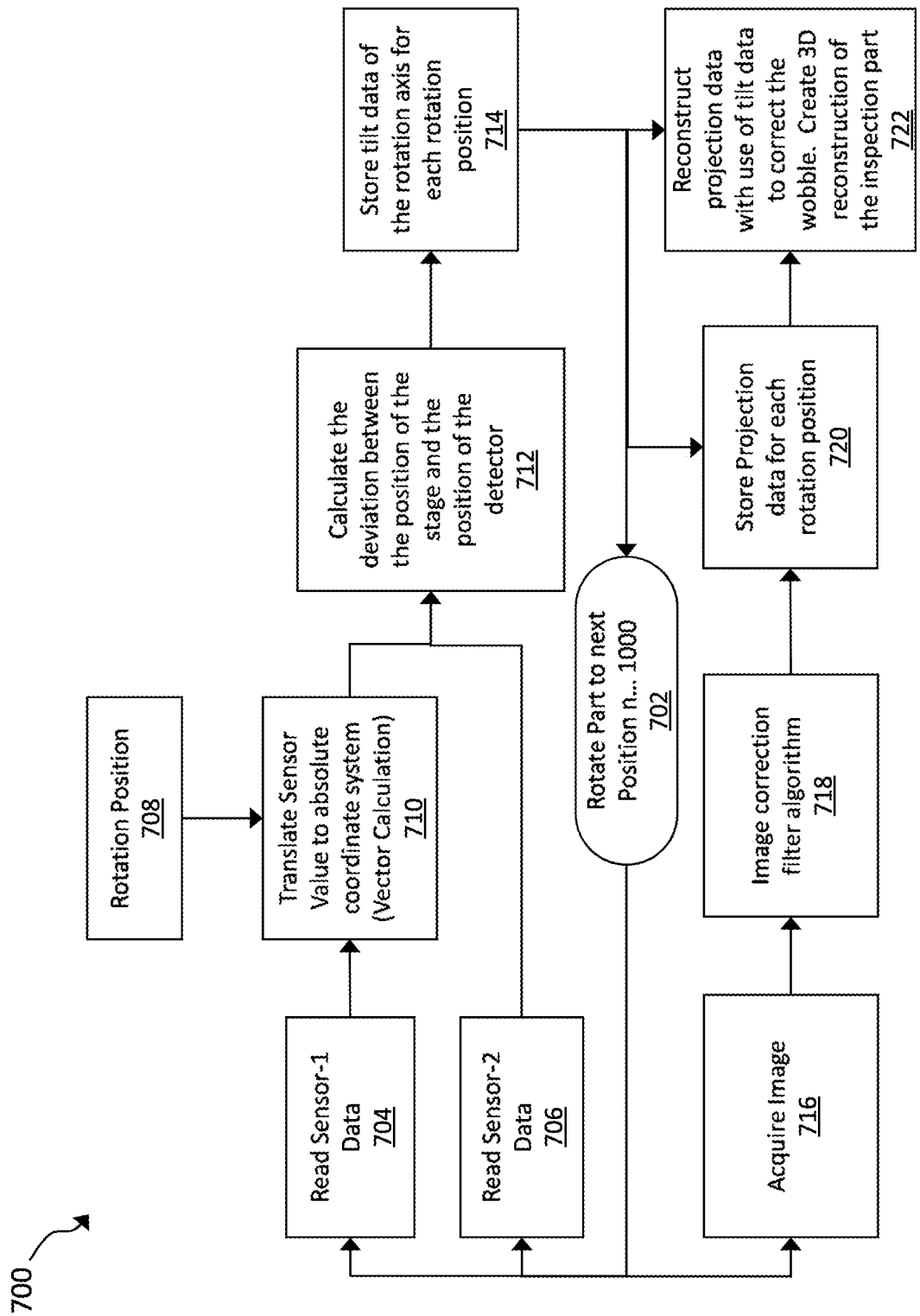
FIG. 13 is a process flow diagram illustrating an exemplary method of using data from sensors to determine misalignment between an inspection part and a detector.

FIG. 13 illustrates a flow chart of an exemplary method 700 of using data from sensors 618, 620 to determine misalignment between the inspection part 102 and the detector 608. In some cases, misalignment can be characterized by changes in the positions/orientations of the inspection part 102 and the detector 608 relative to known reference positions. At step 702, the stage can be rotated to an angle θ=θx such that the inspection part is at a desired orientation. At step 704, the sensor 618 can measure tilt angles δ, γ. At step 706, the sensor 620 can measure tilt angles φ', ε'. The sensors 618, 620 can provide data to the analyzer 610 characterizing the measured angles δ, γ, ε'. The rotation sensor coupled to the stage can also provide data to the analyzer 610 characterizing a measured angle of rotation θx, as shown at step 708.

At step 710, the analyzer 610 can translate data from the sensor 620 to a value corresponding to an absolute coordinate system (e.g., using a vector calculation). For example, the analyzer 610 can use data characterizing the tilt angles φ', ε' and the rotation angle θx to determine tilt angles φ, ε. Therefore, the analyzer 610 can determine a position of the inspection part 102 relative to the reference axis A1. At step 712, the analyzer 610 can calculate a deviation, or change, between the position of the detector 608 and the stage 606 and/or the inspection part 102. For example, as described above the tilt angles δ, γ can define an orientation of the detector 608 relative to reference axes B1, E6, F6. Similarly, the tilt angles φ, ε can define an orientation of the inspection part 102 relative to the reference axes A1, R6, T6. Since the positions and orientations of the reference axes B1, E6, F6, A1, R6, T6 are known, the analyzer 610 can determine changes between the positions of the inspection part 102 the detector 608. Therefore, the analyzer 610 can determine a total deviation of the position of the inspection part 102 relative to the detector 608. Additionally, the positions and orientations of the detector 608 and the inspection part 102 can be determined with respect to an absolute, or global, coordinate system. At step 714, data characterizing the positions of the detector 608 and the inspection part 102 can be stored (e.g., in memory of the analyzer).

At step 716, an image (e.g., a projectional radiograph) can be acquired. For example the emitter 104 can emit a radiation beam 114, and a portion of the radiation can travel through the inspection part 102. The detector 608 can detect the radiation, e.g., via the detection element 616, including the portion of the radiation that traveled through the inspection part 102. The detected radiation can be, or can characterize, a projected image, or projectional radiograph, of the inspection part 102. The detector 608 can provide data characterizing the projectional radiograph to the analyzer 610. At step 718, the analyzer 610 can perform image correction to the projectional radiograph using, e.g., filtering algorithms, to reduce noise, or artifacts, within the projectional radiograph. At step 720, data characterizing the positions of the detector 608 and the inspection part 102 can be combined with data characterizing the filtered projectional radiograph. Steps 702-720 can be repeated until a desired number of projectional radiographs are obtained.

At step 722, the analyzer 610 can reconstruct the projectional radiographs using the data characterizing the positions of the detector 608 and the inspection part 102 corresponding to each filtered projectional radiograph. For example, data from the sensors 618, 620 characterizing tilt angles δ, γ, φ, ε can be used to adjust values associated with the projections of the inspection part 102 in the projectional radiographs to correct for the mechanical wobble of the stage 606 and/or the detector 608. In some cases positions of the projections of the inspection part 102 can be adjusted based on the tilt angles δ, γ, φ, ε. As another example, values of intensity corresponding to various locations of the projections of the inspection part can be adjusted based on the tilt angles δ, γ, φ, ε. Data from the sensors 618, 620 can be applied in any number of algorithms that can be used to adjust values associated with the projections of the inspection part 102. The reconstructed projectional radiographs can be used to create a 3D reconstruction of the inspection part 102. In some cases, data from the sensors 618, 620 can be used to adjust values associated with projections of the inspection part 102 during tomographic reconstruction to generate tomographic images and 3-dimensional reconstructions of the inspection part 102.

By using sensor data characterizing the measured tilt angles δ, γ, φ, ε to adjust projectional radiographs, the analyzer 610 can perform various image correction operations to reduce artifacts within, and unsharpness of, tomographic images and 3-dimensional reconstructions of the inspection part 102. Reducing artifacts and unsharpness of tomographic images and 3-dimensional reconstructions can result in improved quality of tomographic images and 3-dimensional reconstructions.

Figure 14:
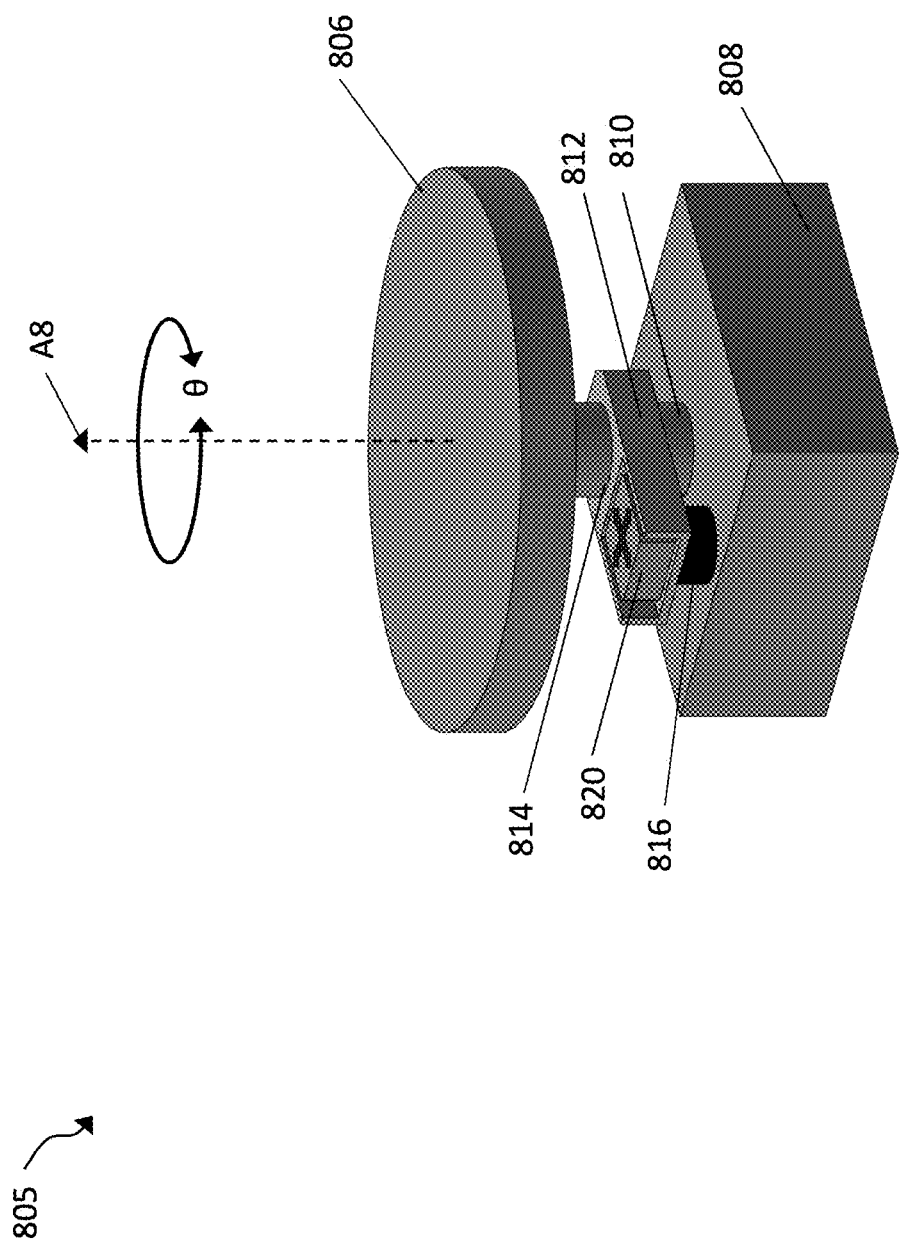
FIG. 14 is a magnified view of an embodiment of a stage assembly.

In some embodiments, a sensor can be coupled to a stage assembly such that the sensor does not rotate with a stage of the stage assembly during scanning. The sensor can measure tilt angles of the stage directly. FIG. 14 shows a stage assembly 805 that includes a sensor 820 (e.g., a digital inclinometer) configured to measure tilt angles of a stage 806 of the stage assembly 805. The stage assembly 805 can be used within CT systems such as, e.g., the CT system 600 shown in FIG. 6. In the illustrated example, the stage assembly 805 includes the stage 806 coupled a base 808 via a drive shaft 810. The stage 806 can be configured to receive an inspection part (e.g., inspection part 102) coupled thereto. A drive element (e.g., motor) can be configured to rotate the drive shaft 810, thereby rotating the stage 806 and the inspection part about an axis A8. The stage assembly 805 can include a rotation sensor configured to measure rotation angles θ of the stage 806.

The sensor 820 can be coupled to a bracket 812. The bracket 812 can be coupled to the drive shaft 810 and the base 808 of the stage assembly 805. In the illustrated example, the drive shaft 810 can extend through an opening 814 in the bracket 812. The opening 814 of the bracket can include a bearing that couples to the drive shaft 810 such that the drive shaft 810 can rotate relative to the bracket 812. In some embodiments, the drive shaft 810 and the bearing can have a high concentric run-out to facilitate rotation of the drive shaft 810 relative to the bracket 812. The sensor 820 can be mounted to the bracket 812 at a location adjacent to the opening 814.

The bracket 812 can be coupled to the base 808 of the stage assembly via a biasing element 816, or flexible member. The biasing element 816 can extend from the base 808 to couple to the bracket 812 such that the sensor 820 is positioned above the biasing element 816.

Figure 15:
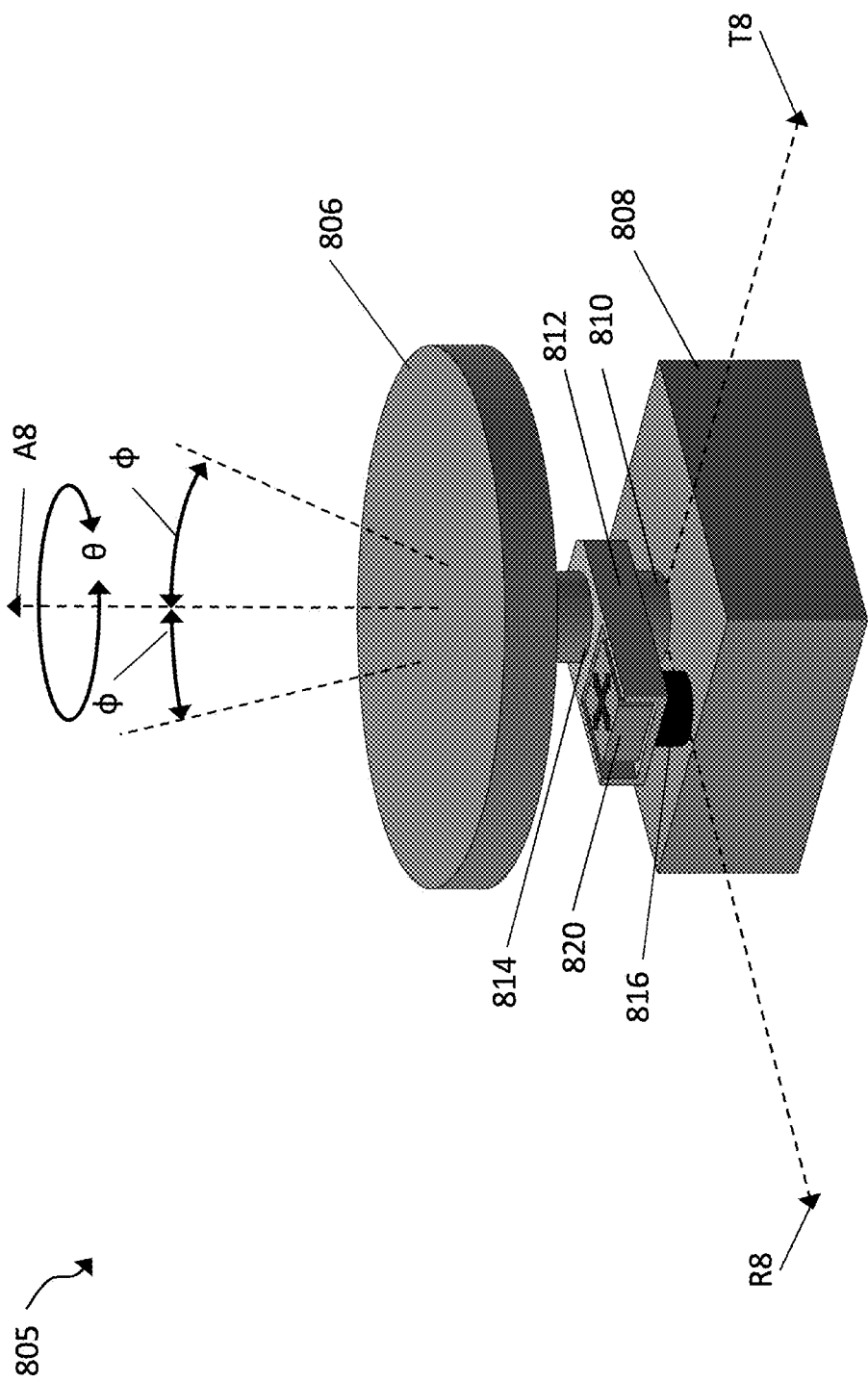
FIG. 15 is another magnified view of the stage assembly shown in FIG. 14, showing a tilt angle that can be measured by a sensor coupled to the stage assembly.
Figure 16:
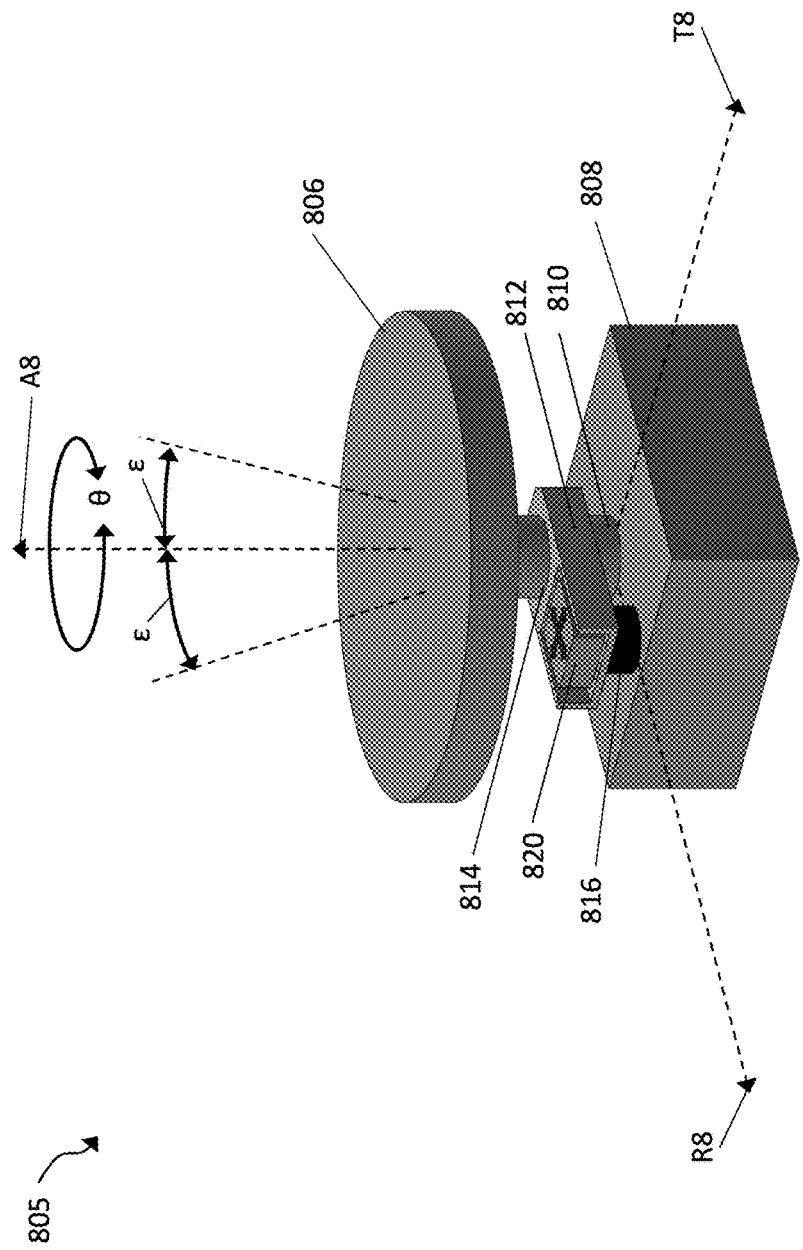
FIG. 16 is another magnified view of the stage assembly shown in FIG. 14, showing another tilt angle that can be measured by the sensor coupled to the stage assembly.

As shown in the illustrated FIGS. 15-16, the stage 806 can rotate, or tilt, in two directions. For example, as shown in FIG. 15, the stage 806 and the drive shaft 810 can rotate about an axis R8 such that the stage 806 is positioned at an angle γ relative to a plane defined by axes A8, R8. Alternatively and/or additionally, the stage 806 and the drive shaft 810 can rotate about an axis T8 such that the stage 806 is positioned at an angle c relative to a plane defined by axes A8, T8, as shown in FIG. 16. The axes A8, R8, T8 can be reference axes that can identify a desired, or expected orientation of the stage 806 and the inspection part 102. The positions and orientations of axes A8, R8, T8 can be known. The tilt angles φ, ε can define a position and/or orientation of an axis of rotation of the inspection part that can be coupled to the stage 806.

When the stage 806 and the drive shaft 810 tilt, the bracket 812 can be tilted in the same manner since the drive shaft 810 extends through the opening 814 of the bracket 812. The biasing element 816 can allow the bracket 812 and the sensor 820 to tilt with the drive shaft 810 and the stage 806. Therefore, the sensor 820 can measure tilt angles φ, ε of the stage 806. The biasing element 816 can also provide some resistance to mitigate tilt of the drive shaft 810 and the stage 806.

The tilt angles φ, ε can be used to adjust values associated with the inspection part in the projectional radiographs to correct for the mechanical wobble of the stage, as described herein. By using data characterizing the measured tilt angles φ, ε to adjust projectional radiographs, artifacts within, and unsharpness of, tomographic images and 3-dimensional reconstructions of the inspection part can be reduced. Reducing artifacts and unsharpness of tomographic images and 3-dimensional reconstructions can result in improved quality of tomographic images and 3-dimensional reconstructions.

In some embodiments, the sensors (e.g., sensors 618, 620, 820) facilitate determining positions and/or orientations of an inspection part and a detector of a CT system, without needing to be in optical or physical communication with each other. In some cases, the sensor can use forces generated by gravity to determine tilt angles of the inspection part and/or the detector. The use of gravity can contribute to robust functionality of the sensors.

Traditionally, the quality of tomographic images and/or 3-dimensional reconstructions of inspection parts can be dependent upon the type, and quality, of the stage and/or stage assembly that the inspection part is mounted to. The use of position and/or orientation data acquired by sensors to correct for mechanical wobble can increase precision, or consistency, of tomographic images and/or 3-dimensional reconstructions of inspection parts generated when using different stages and/or stage assemblies. Therefore, the quality of tomographic images and/or 3-dimensional reconstructions can be less dependent upon the stages and/or stage assemblies used during scanning.

Exemplary technical effects of the subject matter described herein include the ability to determine positions and orientations of a detector and an inspection part of a CT system. The positions/orientations of the inspection part and the detector can each be determined relative to the other, and can be defined in an absolute coordinate system. In some embodiments, sensors coupled to a stage assembly and the detector can be used to determine the tilt angles of a stage and the detector, respectively. The positions/orientations of the detector and the inspection part can be defined, at least in part, by tilt angles (e.g., δ, γ, φ, ε) relative to reference axes (e.g., B1, E6, F6, A1, R6, T6) and/or planes defined by various combinations of the reference axes. Data from the sensors characterizing tilt angles can be used to adjust values associate with projections of the inspection part in the projectional radiographs to correct for the mechanical wobble of the stage and/or the detector. By using sensor data characterizing the measured tilt angles to adjust projectional radiographs, artifacts within, and unsharpness of, tomographic images and 3-dimensional reconstructions of the inspection part can be reduced. Reducing artifacts and unsharpness of tomographic images and 3-dimensional reconstructions can result in improved quality of tomographic images and 3-dimensional reconstructions.

One skilled in the art will appreciate further features and advantages of the subject matter described herein based on the above-described embodiments. Accordingly, the present application is not to be limited specifically by what has been particularly shown and described. All publications and references cited herein are expressly incorporated herein by reference in their entirety.

Other embodiments are within the scope and spirit of the disclosed subject matter. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

In some embodiments, sensors (e.g., sensors 618, 620, 820) can be configured to measure tilt/rotation in three dimensions. As another example, the sensors (e.g., sensors 618, 620, 820) can be accelerometers.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A system comprising:
   an emitter configured to emit radiation;
   a stage assembly including:
      a stage positioned at a first angle relative to a first reference axis, the stage configured to couple to an inspection part and to rotate the inspection part about a first rotation axis, and
      a first sensor coupled to the stage, the first sensor configured to measure the first angle; and
   a detector positioned at a second angle relative to a second reference axis, the detector configured to detect at least a portion of the radiation emitted by the emitter, the detector including:
      a second sensor configured to measure the second angle.

2. The system of claim 1, further comprising an analyzer configured to receive measurement data characterizing the first angle and the second angle from the first sensor and the second sensor, respectively, the analyzer including at least one data processor configured to generate one or more images of the inspection part based on the received measurement data.

3. The system of claim 2, wherein the at least one data processor of the analyzer is configured to compensate for a tilt angle of one or more of the stage and the detector using the received measurement data, and to generate the one or more images according to the compensation.

4. The system of claim 2, wherein the at least one data processor of the analyzer is configured to compensate for a tilt angle of one or more of the stage and the detector using the received measurement data, and to perform an image correction operation on the one or more images according to the compensation.

5. The system of claim 1, wherein the first sensor is configured to measure an orientation of the stage relative to the first reference axis.

6. The system of claim 1, wherein the first sensor is configured to measure movement of the stage in a first plane and movement of the stage in a second plane perpendicular to the first plane.

7. The system of claim 1, wherein the first sensor is disposed on a surface of the stage.

8. The system of claim 1, wherein the second sensor is configured to measure an orientation of the detector relative to the second reference axis.

9. The system of claim 1, wherein the second sensor is configured to measure movement of the detector in a first plane and movement of the detector in a second plane perpendicular to the first plane.

10. The system of claim 1, wherein the second sensor is disposed on a surface of the detector.

11. The system of claim 1, further comprising an analyzer configured to receive data from the first sensor, wherein the first sensor is configured to detect a change in position thereof with respect to an initial position of the first sensor, and the analyzer includes at least one data processor that is configured to calculate the first angle based on the detected change in position of the first sensor.

12. The system of claim 1, further comprising an analyzer configured to receive data from the second sensor, wherein the second sensor is configured to detect a change in position thereof with respect to an initial position of the second sensor, and the analyzer includes at least one data processor that is configured to calculate the second angle based on the detected change in position of the second sensor.

13. The system of claim 1, wherein the first angle corresponds to a tilt angle of the stage relative to the first reference axis, and the second angle corresponds to a tilt angle of the detector relative to the second reference axis.

14. The system of claim 1, wherein the first sensor is disposed on the stage such that the first sensor is configured to rotate during rotation of the stage.

15. The system of claim 1, wherein the first sensor is fixedly mounted such that the first sensor is configured to remain stationary during rotation of the stage.

16. The system of claim 15, wherein the stage assembly further includes:
   a base;
   a bracket fixed to the base, the bracket having an opening formed therethrough; and
   a rotatable drive shaft extending through the opening of the bracket, the drive shaft configured to effect the rotation of the stage,
   wherein the first sensor is mounted to a portion of the bracket.

17. The system of claim 1, wherein the first and second sensors are digital inclinometers.

18. The system of claim 1, wherein the stage assembly further includes a rotation sensor configured to measure an angle of rotation of the stage.

19. A method comprising:
   rotating a stage about a first rotation axis, wherein the stage is positioned at a first angle relative to a first reference axis and coupled to an inspection part;
   emitting radiation toward the inspection part by an emitter;
   measuring the first angle using a first sensor coupled to the stage;
   detecting at least a portion of the radiation emitted by the emitter using a detector positioned at a second angle relative to a second reference axis; and
   measuring the second angle using a second sensor coupled to the detector.

20. The method of claim 19, further comprising:
   receiving measurement data characterizing the first angle and the second angle from the first sensor and the second sensor, respectively;

compensating for a tilt angle of one or more of the stage and the detector using the received measurement data; and generating one or more images of the inspection part according to the compensation.

* * * * *